(12) United States Patent
Bergquist et al.

(10) Patent No.: US 12,487,609 B2
(45) Date of Patent: Dec. 2, 2025

(54) CONTROL UNIT AND METHOD THEREIN FOR OPERATING AN AUTONOMOUS VEHICLE

(71) Applicant: VOLVO TRUCK CORPORATION, Gothenburg (SE)

(72) Inventors: Stefan Bergquist, Gothenburg (SE); Linus Hagvall, Gothenburg (SE); Christian Grante, Västra Frölunda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 66 days.

(21) Appl. No.: 18/700,560

(22) PCT Filed: Oct. 15, 2021

(86) PCT No.: PCT/EP2021/078595
§ 371 (c)(1),
(2) Date: Apr. 11, 2024

(87) PCT Pub. No.: WO2023/061608
PCT Pub. Date: Apr. 20, 2023

(65) Prior Publication Data
US 2024/0427345 A1    Dec. 26, 2024

(51) Int. Cl.
*G05D 1/247* (2024.01)
*G05D 105/05* (2024.01)
(Continued)

(52) U.S. Cl.
CPC ......... *G05D 1/247* (2024.01); *G05D 2105/05* (2024.01); *G05D 2105/28* (2024.01); *G05D 2111/30* (2024.01)

(58) Field of Classification Search
CPC . G05D 1/247; G05D 2105/28; G05D 2105/05
See application file for complete search history.

(56) References Cited

U.S. PATENT DOCUMENTS

| 9,688,288 B1 | 6/2017 | Lathrop et al. |
| 10,824,164 B2 * | 11/2020 | Walton .................. G05D 1/617 |

(Continued)

FOREIGN PATENT DOCUMENTS

| WO | 2019013948 A1 | 1/2019 |
| WO | 2019158261 A1 | 8/2019 |
| WO | 2020142548 A1 | 7/2020 |

OTHER PUBLICATIONS

European Communication pursuant to Rules 161(1) and 162 EPC dated May 23, 2024 in corresponding European Patent Application No. 21797962.4, 3 pages.

(Continued)

*Primary Examiner* — Ramsey Refai
(74) *Attorney, Agent, or Firm* — Jeffri A. Kaminski; Venable LLP

(57) ABSTRACT

A method performed by a control unit for operating an autonomous vehicle is provided. The control unit is arranged to communicate via at least one antenna. The control unit obtains, based on a signal from the at least one antenna, information relating to at least one geographical zone associated with a transponder as the autonomous vehicle moves in proximity of the transponder. Also, the control unit determines an autonomous operating mode of the autonomous vehicle based on the obtained information relating to the at least one geographical zone associated with the transponder. The control unit further operates the autonomous vehicle in accordance with the determined autonomous operating mode.

16 Claims, 3 Drawing Sheets

(51) Int. Cl.
G05D 105/28 (2024.01)
G05D 111/30 (2024.01)

(56) References Cited

U.S. PATENT DOCUMENTS

| | | | |
|---|---|---|---|
| 11,614,748 B2* | 3/2023 | Walton | B66F 9/06 |
| | | | 700/217 |
| 2015/0309512 A1 | 10/2015 | Cudak et al. | |
| 2016/0327955 A1* | 11/2016 | Walton | G05D 1/0088 |
| 2017/0102700 A1 | 4/2017 | Kozak | |
| 2017/0259832 A1 | 9/2017 | Lathrop et al. | |
| 2019/0064345 A1 | 2/2019 | Reed et al. | |
| 2019/0092341 A1 | 3/2019 | Stark et al. | |
| 2019/0120640 A1 | 4/2019 | Ho et al. | |
| 2019/0163188 A1 | 5/2019 | Walton et al. | |
| 2020/0019165 A1 | 1/2020 | Levandowski et al. | |
| 2020/0307578 A1 | 10/2020 | Magolan et al. | |
| 2021/0034054 A1 | 2/2021 | Patnaik et al. | |
| 2021/0034060 A1 | 2/2021 | Patnaik et al. | |
| 2021/0241612 A1* | 8/2021 | Ucar | G01C 21/3461 |

OTHER PUBLICATIONS

International Search Report and Written Opinion of the International Searching Authority in corresponding International Application No. PCT/EP2021/078595 mailed Jun. 27, 2022 (13 pages).
Written Opinion of the International Preliminary Examining Authority in corresponding International Application No. PCT/EP2021/078595 mailed Mar. 23, 2023 (4 pages).
International Preliminary Report on Patentability in corresponding International Application No. PCT/EP2021/078595 mailed Jan. 23, 2024 (7 pages).

* cited by examiner

CONTROL UNIT AND METHOD THEREIN FOR OPERATING AN AUTONOMOUS VEHICLE

CROSS-REFERENCE TO RELATED APPLICATIONS

This application is a U.S. National Stage application of International Application No. PCT/EP2021/078595, filed Oct. 15, 2021 and published on Apr. 20, 2023 as WO 2023/061608, all of which is hereby incorporated by reference in its entirety.

TECHNICAL FIELD

Embodiments herein relate in general to operating autonomous vehicles. In particular, embodiments herein relate to a control unit and a method therein for operating an autonomous vehicle. Also, the embodiments herein also relate to a computer program product and a carrier.

BACKGROUND

Autonomous operation of vehicles is today being implemented for a wide range of different vehicles. Some examples may comprise heavy-duty vehicles, such as, trailers, semi-trailer vehicles, trucks for cargo transport, etc., and working machines, such as, e.g. excavators, fork lifts, loaders, haulers, etc. In some cases, such automated heavy-duty vehicles and/or working machines may at times be designated to operate within and/or between certain geographical zones, such as, e.g. construction sites, harbour areas, docking areas, etc.

While operating within or between such geographical zones or sites, it may be desired that the autonomous vehicles only are allowed to stay within certain boundaries. These boundaries may, for example, be geographical boundaries, speed boundaries, time-of-day boundaries, etc. It may also be highly important or even necessary to ensure that a vehicle that is operating within or between such geographical zones strictly adheres to the boundaries for each particular geographical zone; this, in order to maintain the safety of all automated vehicles operating within or between certain geographical zones. However, implementing these types of zone boundaries may require complex and advanced systems and implementations employing, e.g. wireless telecommunications networks, Global Navigation Satellite System/Global Positioning Systems (GNSS/GPS), radars, LIDARs, etc. This requires non-stop continuous connectivity at all times to operate properly, and may not always be able to keep the operation of the autonomous vehicles in the zones continuously safe and robust.

SUMMARY

It is an object of embodiments herein to provide a control unit and method therein, along with computer program products and an autonomous vehicle, for operating an autonomous vehicle that seeks to mitigate, alleviate, or eliminate all or at least some of the above-discussed drawbacks of presently known solutions.

According to a first aspect of embodiments herein, the object is achieved by a method performed by a control unit for operating an autonomous vehicle. Here, the control unit is arranged to communicate via at least one antenna. The method comprises obtaining, based on a signal from the at least one antenna, information indicating at least one geographical zone associated with a transponder as the autonomous vehicle moves in proximity of the transponder. Also, the method comprises determining an autonomous operating mode of the autonomous vehicle based on the obtained information relating to the at least geographical zone associated with the transponder. The method further comprises operating the autonomous vehicle in accordance with the determined autonomous operating mode.

By having a control unit controlling the autonomous operating mode of an autonomous vehicle based on a geographical zone indicated by a transponder as the autonomous vehicle traverses or passes the transponder, it may be ensured that the local boundaries applied in the current geographical zone is adhered to by the autonomous vehicle in an continuously safe and robust manner. For example, transponders using non-complex, short-range communication may be deployed, either permanently or movably, to indicate the borders of different geographical zones and transmit the local boundaries applied in its associated geographical zone to an autonomous vehicle that is moving within proximity of the transponder, i.e. passing within the transmission range of the transponder with its antenna. Hence, the safety of autonomous vehicles operating within and/or between determined geographical zones is maintained in a simple, cost-efficient, and flexible way.

In some embodiments, the autonomous operating mode may comprise one or more of: a speed, a full stop command, an off-switch command, and one or more steering angle limits. Also, according to some embodiments, the autonomous operating mode may comprise one or more threshold levels for the autonomous vehicle on any one of: one or more steering angle rates, an acceleration, a curvature, a yaw rate, an articulation rate, a roll angle, a driving direction, a type of propulsion to be used in case the autonomous vehicle is a hybrid vehicle. This may provide various different types of local boundaries for the autonomous vehicle operating within a certain geographical zone in order to ensure a safe operation of the autonomous vehicle therein.

Furthermore, in some embodiments, the autonomous operating mode may comprise a limitation for the autonomous vehicle to a set of determined approved vehicle actions, or one or more use requirements of difference vehicle applications or hardware. Hence, for example, some actions or use of certain applications or hardware may advantageously be prohibited to be performed by the autonomous vehicle in a particular geographical zone.

In some embodiments, the obtained information relating to the at least one geographical zone associated with the transponder may comprise a time limit and/or maximum driving distance, which in case of expiration before any information relating to another geographical zone associated with a subsequent transponder is obtained will cause the control unit to switch to another autonomous operating mode of the autonomous vehicle. This may advantageously ensure that an autonomous vehicle does not spend too much time in a specific geographical zone or that the driving distance of the autonomous vehicle has exceed the normal driving distance within a specific geographical zone, as this may, for example, be indicating that something is wrong in the operation of the autonomous vehicle. The autonomous operating mode to which the autonomous vehicle is switched may cause the autonomous vehicle to, for example, brake, stop or turn off the autonomous vehicle. Also, in some embodiments, the obtained information relating to the at least one geographical zone associated with the transponder may comprise a time-dependent entrance criteria which if not fulfilled will cause the control unit to switch to another autonomous operating mode of the autonomous vehicle. Hence, for example, it may not be possible for the autonomous vehicle to enter into a specific geographical zone that is closed off at a certain point in time.

Further, in some embodiments, the obtained information relating to the at least one geographical zone associated with the transponder comprise an indication to follow a specifically defined path upon operating in the at least one geographical zone associated with the transponder which if not adhered to will cause the control unit to switch to another autonomous operating mode of the autonomous vehicle. This may advantageously restrict the movement of the autonomous vehicle to a certain path within a specific geographical zone. This may be performed in order to have a safe operation of the autonomous vehicle or for other security reasons.

According to a second aspect of embodiments herein, the object is achieved by a control unit for operating an autonomous vehicle. The control unit is arranged to communicate via at least one antenna. The control unit is configured to obtain, based on a signal from the at least one antenna, information relating to at least one geographical zone associated with a transponder as the autonomous vehicle moves in proximity of the transponder. Also, the control unit is configured to determine an autonomous operating mode of the autonomous vehicle based on the obtained information relating to the at least geographical zone associated with the transponder. The control unit is further configured to operate the autonomous vehicle in accordance with the determined autonomous operating mode.

In some embodiments, the control unit the autonomous operating mode may comprise one or more of: a speed, a full stop command, an off-switch command, and one or more steering angle limits. Additionally, in some embodiments, the autonomous operating mode may comprise one or more threshold levels for the autonomous vehicle on any one of: one or more steering angle rates, an acceleration, a curvature, a yaw rate, an articulation rate, a roll angle, a driving direction, or a type of propulsion to be used in case the autonomous vehicle is a hybrid vehicle. Further, in some embodiments, the autonomous operating mode may comprise a limitation for the autonomous vehicle to a set of determined approved vehicle actions, or one or more use requirements of difference vehicle applications or hardware.

Also, in some embodiments, the control unit may be configured to switch to another autonomous operating mode of the autonomous vehicle in case a time limit and/or maximum driving distance comprised in the obtained information relating to the at least one geographical zone associated with the transponder, expires before any information relating to another geographical zone associated with a subsequent transponder is obtained. In some embodiments, the control unit may be configured to switch to another autonomous operating mode of the autonomous vehicle in case a time-dependent entrance criteria comprised in the obtained information relating to the at least one geographical zone associated with the transponder, expires before any information relating to another geographical zone associated with a subsequent transponder is not fulfilled. Further, in some embodiments, the control unit may be configured to switch to another autonomous operating mode of the autonomous vehicle in case an indication to follow a specifically defined path upon operating in the at least one geographical zone associated with the transponder comprised in the obtained information relating to the at least one geographical zone associated with the transponder is not adhered to.

According to a third aspect of the embodiments herein, the object is achieved by a computer program comprising instructions which, when executed in a processing circuitry, cause the processing circuitry to carry out the method described above. According to a fourth aspect of the embodiments herein, the object is achieved by a carrier containing the computer program described above, wherein the carrier is one of an electronic signal, optical signal, radio signal, or computer-readable storage medium.

According to a fifth aspect of the embodiments herein, the object is achieved by an autonomous vehicle comprising a control unit as described above. In some embodiments, the autonomous vehicle may be attached to a trailer, wherein the trailer is arranged with at least one additional antenna arranged to be connected to the control unit of the autonomous vehicle.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

Figure 1:
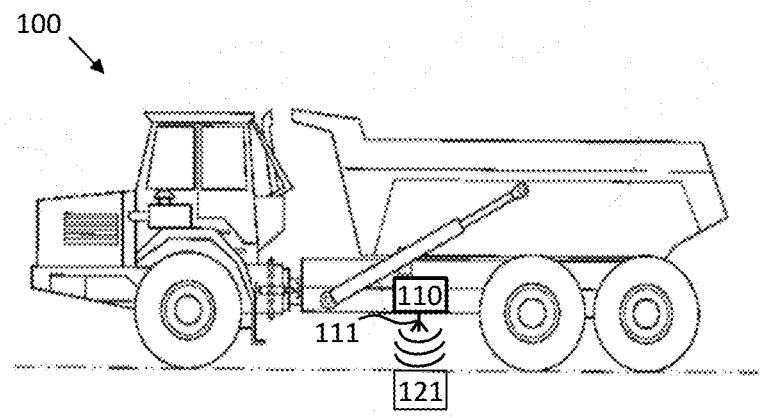
FIG. 1 is a side view depicting embodiments of an autonomous vehicle.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description. It is to be understood that the present invention is not limited to the embodiments described herein and illustrated in the drawings; rather, the skilled person will recognize that many changes and modifications may be made within the scope of the appended claims.

FIG. 1 illustrates an example of an autonomous vehicle 100. In this case, the autonomous vehicle 100 is exemplified as a working machine, in particular an articulated hauler or dumper. Here, the operation of the autonomous vehicle 100 may be at least partly controlled by a control unit 110. For example, the control unit 110 may determine a specific autonomous operating mode for an on-board automated driving system. This on-board automated driving system may be configured to adhere to and follow the specific autonomous operating mode determined and communicated by the control unit 110. In some embodiments, the control unit 110 may be integrated with and form a part of the on-board automated driving system. In some embodiments, the control unit 110 may also be connected to the brake- and steering systems of the vehicle 100 and on-board sensors, such as, for example, steering wheel angle sensor, wheel speed sensors, etc. The control unit 110 may be connected to, or arranged to communicate with, at least one antenna 111. The control unit 110 is configured to use the at least one antenna 111 in order to transmit and receive information from a transponder 121 when passing within the transmission range of the transponders 121. The control unit 110, the at least one antenna 111 and the transponder 121 may be configured to use various different short-range communication technologies, such as, e.g. Near-Field Communications (NFC), Radio-Frequency Identification (RFID), Wireless Local Area Networks (WLAN), Ultra-wideband (UWB) or Bluetooth wireless communications for transmitting and receiving information to/from each other. In some embodiments, the control unit 110 may also be referred to as a geo-fencing logics unit.

According to some embodiments, a first on-board Electronic Control Unit, ECU, may be connected to, or coupled to, the at least one antenna 111. The first onboard ECU may then read the information from the transponder 121 and forward the information to a second on-board ECU, i.e. the control unit 110 in this case. The second on-board ECU may then determine a specific autonomous operating mode and control the autonomous vehicle 100 accordingly. For example, by being connected directly to the actuators for controlling the vehicle 100 or in co-operation with an on-board automated driving system.

In some embodiments, using e.g. RFID, a transponder 121 may be configured with a specific unique identity or identification number. As the control unit 110 and the at least one antenna 111 passes within the transmission range of the transponder 121, the control unit 110 may via the antenna 111 transmit an interrogation signal to the transponder 121. The transponder 121 may respond by generating or transmitting a feedback signal back to the at least one antenna 111 and the control unit 110, wherein the feedback signal may comprise the specific unique identity or identification number of the transponder 121. However, other more complex information, such as, for example, information stored in an integrated memory in the transponder 121, may also be transmitted back to the control unit 110. The control unit 110, the at least one antenna 111 and the transponder 121 may, for example, be configured to use passive, active or semi-passive RFIDs.

In case the feedback signal from the transponder 121 only comprises the specific unique identity or identification number of the transponder 121, the control unit 110 be configured with, or be arranged to communicate with, a database (not shown) comprising information associated with the specific unique identity or identification number of the transponder 121. The database may comprise information indicating certain limitation or boundaries forming or making up a specific autonomous driving mode within the corresponding geographical zone. Examples of information that may be stored in the database for the transponder 121, i.e. information associated with the unique identity or identification number of the transponder 121, may comprise, for example, one or more of:

the position of the transponder 121 in a local/global coordinate system;
the maximum allowed velocity between this transponder 121 and the next upcoming transponder along a route;
the minimum allowed steering angle between the transponder 121 and the next upcoming transponder along a route;
the maximum allowed steering angle between the transponder 121 and the next upcoming transponder along a route;
a distance that the vehicle 100 is allowed to drive before another transponder is detected;
a time period for which the vehicle 100 is allowed to drive before a another transponder is detected;
the unique identity or identification number of the next upcoming transponder;
the maximum allowed velocity after the next upcoming transponder on a route;
the minimum allowed steering angle after the next upcoming transponder on a route; and
the minimum allowed steering angle after the next upcoming transponder on a route.

For example, in some embodiments, the control unit 110 may determine the location of the autonomous vehicle 100 based on the position of the transponder 121 in a local/global coordinate system.

Optionally, according to some embodiments, the reception of the feedback signal from the transponder 121 may also be used as input to a counter in the control unit 110, wherein the counter value may be used to determine a location of the vehicle 100 along a route. Alternatively, the reception of the feedback signal from the transponder 121 may also be used to obtain a point in time, which the control unit 110 may transmit further in order to provide a "heartbeat"-signal to a centralized control system located a distance from the vehicle 100. This signal may then, for example, be used by the centralized control system to determine a location of the vehicle 100 along a route. The centralized control system may then transmit information back to the control unit 110 based on the determined location of the vehicle 100 along the route.

Figure 2:
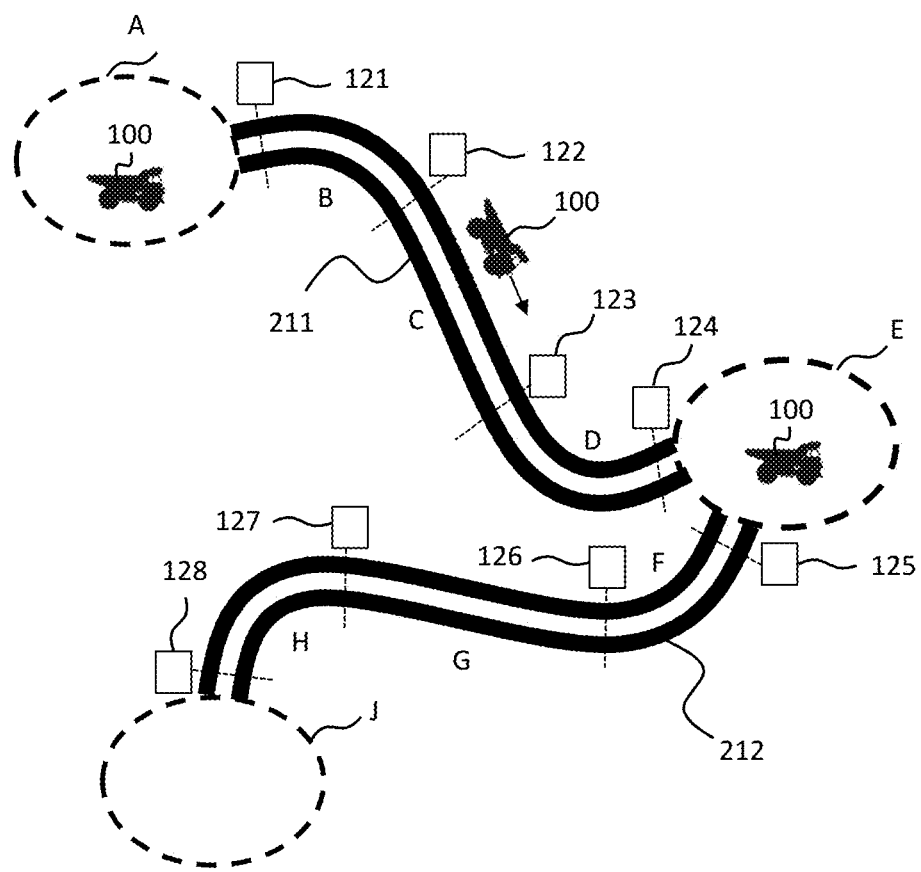
FIG. 2 is a schematic illustration of different geographical zones arranged with transponders according to some embodiments.

FIG. 2 illustrates a number of different geographical zones A-J arranged with transponders 121-128 according to some embodiments. The different geographical zones A-J may comprise different geographical sites or areas A, E, J and different geographical route segments B-D, F-H.

In this example, an autonomous vehicle 100 may for a certain period of time operate within the geographical site or area A. However, as the autonomous vehicle 100 leaves the geographical site A along a route towards another geographical site E, the control unit 110 and the at least one antenna 111 on-board the autonomous vehicle 100 may detect the transponder 121 as it passes into the geographical zone B. The control unit 110 may thus receive information from the transponder 121. For example, this information may indicate certain limitations that the autonomous driving system of the vehicle 100 must adhere to or fulfill in the geographical zone B, i.e. an autonomous driving mode. However, it should also be noted that this information may also indicate certain limitations that the autonomous driving system of the vehicle 100 must adhere to or fulfill in the next upcoming geographical zone, i.e. the geographical zone C. In this case, the autonomous driving system of the vehicle 100 may adapt its driving before entering the geographical zone C. According to one example, the information may also indicate the distance that the autonomous vehicle 100 may drive before expecting to detect the next upcoming transponder on the route, i.e. the transponder 122. This may, for example, be set to the approximate distance between the transponder 121 and 122. Advantageously, this may set a limit on how far the autonomous vehicle 100 may go off from the route before the autonomous vehicle 100 is stopped in case an error should occur. Hence, based on this information, the control unit 110 may determine an autonomous operating mode of the vehicle 100 suitable for operating the autonomous vehicle 100 within the geographical zone B. The control unit 110 may then operate the autonomous vehicle 100 accordingly therein. In other words, the control unit 110 may switch autonomous operating mode based on the information indicated by the transponder 121.

After a certain time of operating according to the determined autonomous operating mode in geographical zone B, the autonomous vehicle 100 may pass into the geographical zone C upon which the control unit 110 and the at least one antenna 111 on-board the autonomous vehicle 100 will detect the transponder 122. The control unit 110 may thus receive information from the transponder 122. Similar to the information from the transponder 121, this information may also indicate certain limitations that the autonomous driving system of the vehicle 100 must adhere to or fulfill, but instead adapted for the geographical zone C. Optionally, the information may also comprise information about the next geographical zone D as well. In this case, some information, such as, e.g. velocity and steering values for the next upcoming geographical zone D, or route segment, may provide information to the autonomous driving system of the autonomous vehicle 100, so that the velocity of the autonomous vehicle 100 may be adapted to the next upcoming geographical zone D when getting close to the end of the the geographical zone C. Based on this information, the control unit 110 may determine an autonomous operating mode of the vehicle 100 that is suitable for operating the autonomous vehicle 100 within the geographical zone C. The control unit 110 may then operate the autonomous vehicle 100 accordingly therein. In other words, the control unit 110 may switch autonomous operating mode based on the information indicated by the transponder 122.

Subsequently, the autonomous vehicle 100 may pass into the geographical zone D upon which the control unit 110 and the at least one antenna 111 on-board the autonomous vehicle 100 will detect the transponder 123 and receive a similar type of information as from the previous transponders 121, 122, but instead adapted for the geographical zone D. The control unit 110 may then determine an autonomous operating mode of the vehicle 100 based on this information and then operate the autonomous vehicle 100 accordingly within the geographical zone D. In other words, the control unit 110 may switch autonomous operating mode based on the information indicated by the transponder 123. As the vehicle 100 passes into the geographical site or area E at the end of the route, the control unit 110 and the at least one antenna 111 on-board the autonomous vehicle 100 will detect the transponder 124 and receive a similar type of information as described above, but adapted for the geographical site E. Consequently, the control unit 110 may then determine an autonomous operating mode of the vehicle 100 based on this information and then operate the autonomous vehicle 100 accordingly within the geographical site E. In other words, the control unit 110 may switch autonomous operating mode based on the information indicated by the transponder 124.

It should also be noted that depending on the travelling direction of the autonomous vehicle 100 along the route, e.g. from A-E or from E-A, the information obtained from the transponders 121-128, or the obtained information in the database related to the obtained information from the transponders 121-128, may vary. For example, if the travelling direction of the autonomous vehicle 100 along the route is from A-E, then the transponder 121 will be passed first, the transponder 122 secondly, the transponder 123 thirdly, and last the transponder 124; whereas in case the travelling direction of the autonomous vehicle 100 along the route is from E-A, then the transponder 124 will be passed first, the transponder 123 secondly, the transponder 122 thirdly, and last the transponder 121. Thus, for example, information regarding the next upcoming transponder may vary depending on the travelling direction of the autonomous vehicle 100 along the route.

In FIG. 2, a second route between the geographical site or area E and the geographical site or area J is also described. Here, this second route is divided into three different geographical route segments F, G and H, wherein each of the geographical route segment F, G and H is delimited by the transponders 125-128.

Figure 3:
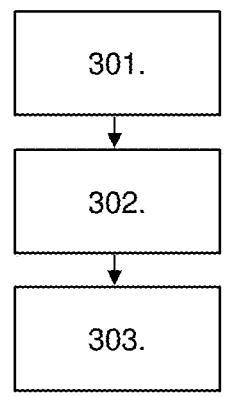
FIG. 3 is a flowchart illustrating embodiments of a method in control unit.

Examples of embodiments of a method performed by a control unit 110 for operating an autonomous vehicle 100, will now be described with reference to the flowchart depicted in FIG. 3. FIG. 3 is an illustrated example of actions, steps or operations which may be performed by the control unit 110 as described above with reference to FIG. 3. Here, the control unit 110 is arranged to communicate with at least one antenna 111. The method may comprise the following actions, steps or operations.

Action 301. The control unit 110 obtains, based on a signal from the at least one antenna 111, information relating to at least one geographical zone A-J associated with a transponder 121-128 as the autonomous vehicle 100 moves in proximity of the transponder 121-128. his has been described in detail above with reference to FIGS. 1-2.

Action 302. After obtaining the information in Action 301, the control unit 110 determines an autonomous operating mode of the vehicle 100 based on the obtained information relating to the at least one geographical zone A-J associated with the transponder 121-128. This means that the operation of the autonomous vehicle 100 may be adapted to a particular geographical zone A-J upon entering each geographical zone A-J, respectively, in a continuously safe and robust manner.

In some embodiments, the determined autonomous operating mode may comprises one or more of: a speed, a full stop command, an off-switch command, and one or more steering angle limits. For example, in case the velocity or one or more steering angles would reach outside the allowed range for a particular geographical zone A-J according to the determined autonomous operating mode, the autonomous vehicle 100 may be stopped and/or turned off. This would advantageously, for example, help to reduce the maximum distance from the route in case of faults. However, it should also be noted that, for example, determined autonomous operating mode may also allow for a higher speeds in a particular geographical zone A-J. This would advantageously assist the autonomous vehicle 100 to perform its task on time in a safe manner.

Also, in some embodiments, the determined autonomous operating mode may comprise one or more threshold levels for the autonomous vehicle 100 on any one of: one or more steering angle rates, an acceleration, a curvature, a yaw rate, an articulation rate, a roll angle, a driving direction, a type of propulsion to be used in case the autonomous vehicle 100 is a hybrid vehicle. For example, for particular geographical zones, it may be that one or a combination of these factors may indicate that a particular operation of the autonomous vehicle 100 is unsuitable. For example, for a steep downhill route comprising a hard turn, the determined autonomous operating mode may comprise a maximum steering angle rate limit, a maximum acceleration limit, a maximum curvature limit, a maximum yaw rate limit, a maximum articulation rate limit, etc., which if exceeded will, according to the determined autonomous operating mode, the autonomous vehicle 100 to force a brake or stop of the autonomous vehicle 100. Here, it may be noted that for a vehicle 100 comprising more than one steerable axle, there may be multiple different steering angles and steering angle rates specified in the determined autonomous operating mode.

Further, according to some embodiments, the determined autonomous operating mode comprises a limitation for the autonomous vehicle 100 to a set of determined approved vehicle actions, or one or more use requirements of difference vehicle applications or hardware. For example, the determined autonomous operating mode may specify that a certain action by the autonomous driving system or a certain working tool is not permitted within a particular geographical zone A-J. Another option here is for the determined autonomous operating mode to specify that a vehicle subsystem is to be turned off, e.g. a steering system of the vehicle 100.

Action 303. After the determination in Action 302, the control unit 110 operate the autonomous vehicle 100 in accordance with the determined autonomous operating mode. This means that the autonomous vehicle 100 and/or autonomous driving system of the autonomous vehicle 100 is to be operated according to the limitations and/or requirements specified by the determined autonomous operating mode.

In some embodiments, the obtained information relating to the at least one geographical zone associated with the transponder 121-128 may comprise a time limit and/or maximum driving distance, which in case of expiration before any information relating to another geographical zone A-J associated with a subsequent transponder 121-128 is obtained will cause the control unit 110 to switch to another autonomous operating mode of the autonomous vehicle 100. For example, an allowed maximum distance may determine how far the autonomous vehicle 100 is allowed to drive in a current geographical zone A-J before detecting the next upcoming transponder 121-128. Hence, if the autonomous vehicle 100 reaches this maximum allowed distance without detecting a new transponder, the control unit 110 may take appropriate action, such as, for example, brake, stop or turn off the autonomous vehicle 100. Also, in some embodiments, the obtained information relating to the at least one geographical zone associated with the transponder 121-128 comprise a time-dependent entrance criteria which if not fulfilled will cause the control unit 110 to switch to another autonomous operating mode of the autonomous vehicle 100. For example, an allowed minimum time frame may determine how far the autonomous vehicle 100 is allowed to drive in a current geographical zone A-J before detecting the next upcoming transponder 121-128. Hence, if the autonomous vehicle 100 exceeds this maximum allowed time frame without detecting a new transponder, the control unit 110 may take appropriate action, such as, for example, brake, stop or turn off the autonomous vehicle 100. Further, in some embodiments, the obtained information relating to the at least one geographical zone associated with the transponder 121-128 comprise an indication to follow a specifically defined path upon operating in the at least one geographical zone A-J associated with the transponder 121-128 which if not adhered to will cause the control unit 110 to switch to another autonomous operating mode of the autonomous vehicle 100. For example, in case the next upcoming transponder 121-128 is not the next expected transponder on the route, the control unit 100 may take appropriate action, such as, for example, brake, stop or turn off the autonomous vehicle 100.

Figure 4:
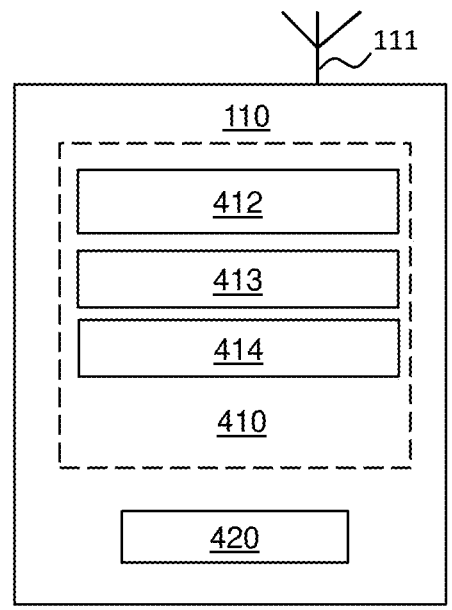
FIG. 4 is a block diagram depicting embodiments of a control unit.

To perform the method actions for operating an autonomous vehicle 100, the control unit 110 may comprise the following arrangement depicted in FIG. 4. FIG. 4 shows a schematic block diagram of embodiments of the control unit 110. The control unit 110 is arranged to communicate via at least one antenna 111. It should also be noted that, although not shown in FIG. 4, known conventional features of a control unit 110, such as, for example, a connection to a power source, e.g. a battery, or connections to brake or steering systems, e.g. on-board actuators or sensors for controlling the movement of the vehicle 100, may be assumed to be comprised in the control unit 110, but is not shown or described in any further detail in regards to FIG. 4. The control unit 110 may comprise processing circuitry 410 and a memory 420. It should also be noted that some or all of the functionality described in the embodiments above as being performed by the control unit 110 may be provided by the processing circuitry 410 executing instructions stored on a computer-readable medium, such as, e.g. the memory 420 shown in FIG. 4. Alternative embodiments of the control unit 110 may comprise additional components, such as, for example, an obtaining module 412, a determining unit 413, and an operating module 814, whereby each module may be configured and responsible for providing its dedicated functionality to support the embodiments described herein.

The control unit 110 or processing circuitry 410 is configured to, or may comprise the obtaining module 413 being configured to, obtain, based on a signal from the at least one antenna 111, information relating to at least one geographical zone A-J associated with a transponder 121-128 as the autonomous vehicle 100 moves in proximity of the transponder 121-128. Also, the control unit 110 or processing circuitry 810 is configured to, or may comprise the determining module 413 being configured to, determine an autonomous operating mode of the autonomous vehicle 100 based on the obtained information relating to the at least geographical zone A-J associated with the transponder 121-128. Further, the control unit 110 or processing circuitry 410 is configured to, or may comprise the operating module 414 being configured to, operate the autonomous vehicle 100 in accordance with the determined autonomous operating mode.

In some embodiments, the autonomous operating mode comprises one or more of: a speed, a full stop command, an off-switch command, and one or more steering angle limits. Also, in some embodiments, the autonomous operating mode comprises one or more threshold levels for the autonomous vehicle 100 on any one of: one or more steering angle rates, an acceleration, a curvature, a yaw rate, an articulation rate, a roll angle, a driving direction, or a type of propulsion to be used in case the autonomous vehicle 100 is a hybrid vehicle. Further, in some embodiments, the autonomous operating mode comprises a limitation for the autonomous vehicle 100 to a set of determined approved vehicle actions, or one or more use requirements of difference vehicle applications or hardware.

Further, according to some embodiments, the control unit 110 or processing circuitry 410 is configured to, or may comprise the operating module 414 being configured to, switch to another autonomous operating mode of the autonomous vehicle 100 in case a time limit and/or maximum driving distance comprised in the obtained information relating to the at least one geographical zone associated with the transponder 121-128, expires before any information relating to another geographical zone A-J associated with a subsequent transponder 121-128 is obtained. In some embodiments, the control unit 110 or processing circuitry 410 is configured to, or may comprise the operating module 414 being configured to, switch to another autonomous operating mode of the autonomous vehicle 100 in case a time-dependent entrance criteria comprised in the obtained information relating to the at least one geographical zone associated with the transponder 121-128, expires before any information relating to another geographical zone A-J associated with a subsequent transponder 121-128 is not fulfilled. Further, in some embodiments, the control unit 110 or processing circuitry 410 is configured to, or may comprise the operating module 414 being configured to, switch to another autonomous operating mode of the autonomous vehicle 100 in case an indication to follow a specifically defined path upon operating in the at least one geographical zone A-J associated with the transponder 121-128 comprised in the obtained information relating to the at least one geographical zone associated with the transponder 121-128, is not adhered to.

Furthermore, the embodiments for operating an autonomous vehicle 100 described above may be at least partly implemented through one or more processors, such as, the processing circuitry 410 in the control unit 110 depicted in FIG. 4, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 410 in the control unit 110. The data carrier, or computer readable medium, may be one of an electronic signal, optical signal, radio signal or computer-readable storage medium. The computer program code may e.g. be provided as pure program code in the control unit 110 or on a server and downloaded to the control unit 110. Thus, it should be noted that the functions of the control unit 110 may in some embodiments be implemented as computer programs stored in memory, e.g. in the computer readable storage unit 420 in FIG. 4, for execution by processors or processing modules, e.g. the processing circuitry 410 in the control unit 110 of FIG. 4.

Those skilled in the art will also appreciate that the processing circuitry 410 and the computer readable storage unit 420 described above may refer to a combination of analog and digital circuits, and/or one or more processors configured with software and/or firmware, e.g. stored in a memory, that when executed by the one or more processors such as the processing circuitry 410 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 5:
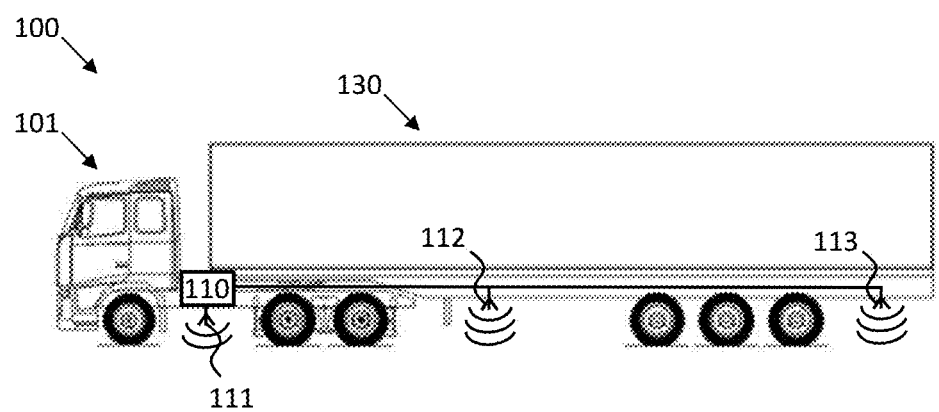
FIG. 5 is a side view depicting further embodiments of an autonomous vehicle.

FIG. 5 illustrates a side view of an embodiment of an autonomous vehicle 100 comprising a control unit 110. In this example, the vehicle 100 in FIG. 5 is a heavy-duty vehicle which comprises a truck or towing vehicle 101 configured to tow a trailer unit 130 in a known manner, e.g., by a fifth wheel connection. Herein, a heavy-duty vehicle is taken to be a vehicle designed for the handling and transport of heavier objects or large quantities of cargo, such as, e.g. a semi-trailer vehicle, rigid trucks and/or multi-trailer heavy-duty vehicles comprising one or more dolly vehicle units. The vehicle 100 may comprise a combustion engine, one or more electric drive units, or a combination or hybrid thereof. Thus, even though the embodiments herein for operating autonomous vehicles are described mainly with respect to working machines or heavy-duty vehicles, such as, the embodiments herein should not be considered restricted to this particular type of vehicle but may also be used in other types of vehicles, such as, e.g. a conventional passenger vehicles or cars. In this example, the vehicle 100 in FIG. 5 is further configured with a control unit 110 that is connected to more than one antenna 111, 112, 113. This may be particularly advantageous in case of having a long extended vehicle 100, since the point in time when each of the antennas 111, 112, 113 receives the information from a transponder 121-128, and thus also the control unit 110, may be used by the control unit 110 to select a suitable operating mode of the vehicle 100. In some embodiments, this information may, for example, be used to determine angles between a truck 101 and its trailer unit 130, which may be used to a suitable operating mode of the vehicle 100.

Figure 6:
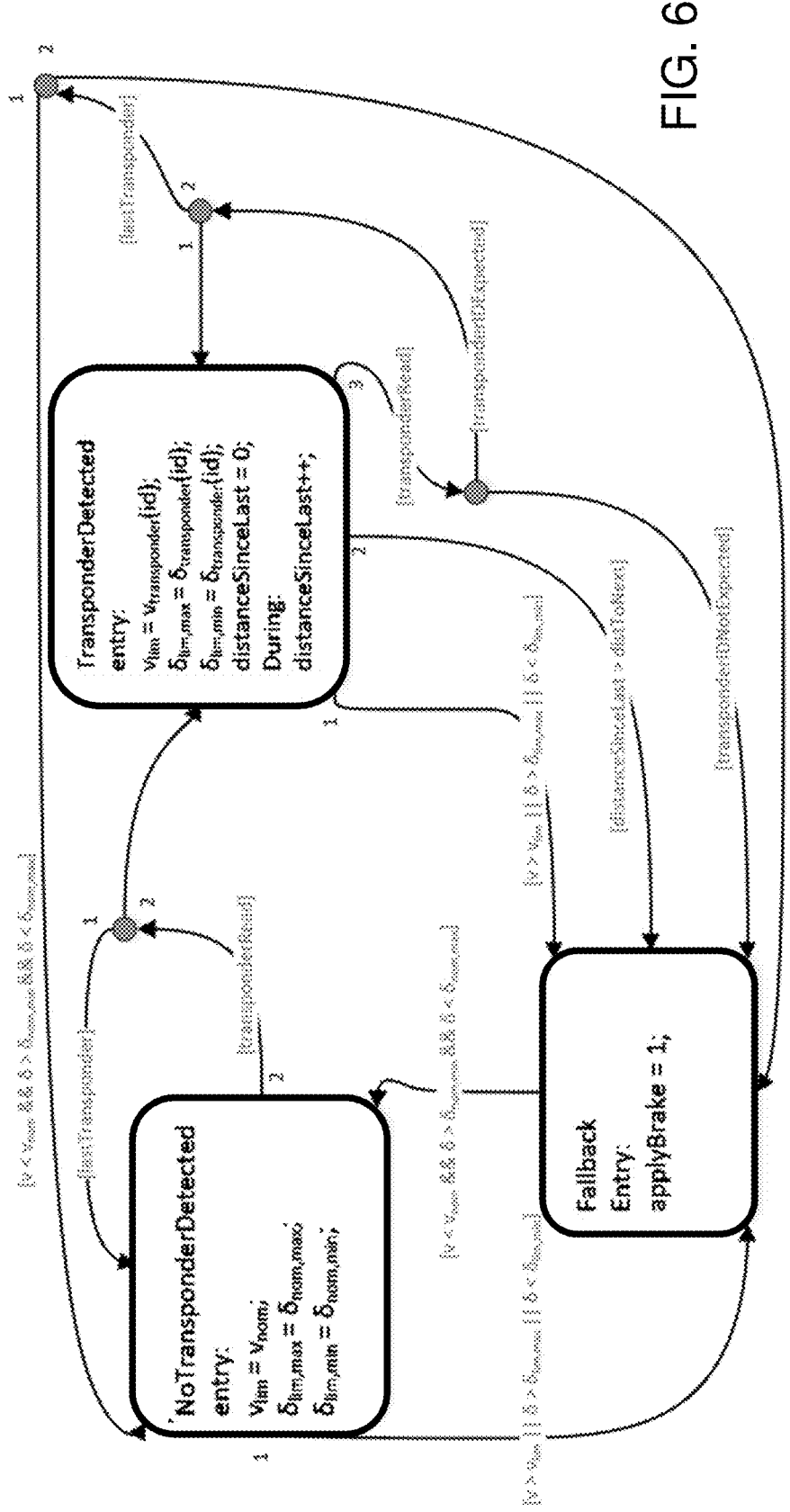
FIG. 6 is a state flow diagram over the implemented logic in a control unit according to some embodiments.

FIG. 6 shows an example of a state flow diagram over the implemented logic in the control unit 110 according to some embodiments.

Here, at start-up, the control unit 110 may be in a NoTransponderDetected state. In this state, for example, the velocity limit and/or steering angle may be set to some nominal velocity or angle. According to some embodiments, two different transitions may occur from this state:

1) In case the current velocity of the autonomous vehicle 100 exceeds the maximum allowed velocity limit, the control unit 110 may change its state to a Fallback state.
2) In case a transponder is read, i.e. the control unit 110 obtains information from a transponder 121-128, the control unit 110 may change it state to a TransponderDetected state. However, if the transponder is the last transponder on a route, the control unit 110 may remain in the NoTransponderDetected state.

In the TransponderDetected state, the velocity of the autonomous vehicle 100 may be limited based on the information indicated by the transponder 121-128, e.g. the identity or identification number of the transponder. Simultaneously, a distanceSinceLast parameter may be set to zero (0). This may indicate that the autonomous vehicle 100 just passed a transponder 121-128. Furthermore, in some cases, the control unit 110 be informed about the distance to the next transponder, e.g. a distToNext parameter, based on the information indicated by the transponder 121-128. While in the TransponderDetected state, the control unit 110 may continuously be update the distance from the last transponder, i.e. a distanceSinceLast parameter, based on the velocity of the autonomous vehicle 100. According to some embodiments, three different transitions may occur from the TransponderDetected state:

1) In case the velocity of the autonomous vehicle 100 exceeds the allowed maximum velocity limit, the control unit 110 may change its state to the Fallback state.
2) In case the distanceSinceLast parameter exceeds the distToNext parameter, the control unit 110 may change its state to the Fallback state.
3) In case a new transponder is read, i.e. the control unit 110 obtains information from a new transponder 121-128, the control unit 110 may change its state to the Fallback state, e.g. if the detected transponder was not the expected transponder for the current route. However, if the new transponder was the expected transponder for the current route and the new transponder is not the last transponder for the current route, the control unit 110 may remain in the TransponderDetected state. In this case, the autonomous operation mode, i.e. the limitations and boundaries of the geographical zone indicated by the previous transponder, may be updated based on the information indicated by the new transponder, i.e. a new autonomous operation mode. Furthermore, if the new transponder was the last transponder for the current route, the control unit 110 may, for example, change to the No TransponderDetected state if the velocity of the autonomous vehicle 100 is below a nominal value, or change to the Fallback state if the velocity of the autonomous vehicle 100 is above a nominal value.

In the Fallback state, the control unit 110 may, for example, apply the brakes in order to reduce the speed of the autonomous vehicle 100. Optionally, the control unit 110 may force a full stop of the autonomous vehicle 100, and even turn off the autonomous vehicle 100, if preferred. In some embodiments, the control unit 110 may, for example, change to the NoTransponderDetected state when the velocity of the autonomous vehicle 100 falls below a nominal value. Alternatively, the control unit 110 may also change back to the No TransponderDetected state, or force a full stop of the autonomous vehicle 100 depending on the error that resulted in the change to the Fallback state.

Optionally, the limitations on certain states in a specific geographical zone may be derived from a desired fallback behaviour. When a fault affecting the position of the autonomous vehicle 100 occurs, the control unit 110 described above may detect this within a certain period of time and thus, for example, cause the autonomous vehicle 100 to apply its brakes. Depending on where the autonomous vehicle 100 is within a geographical zone, there may be more or less room to stop the autonomous vehicle 100. Within some geographical zones, it might be very tight and the autonomous vehicle 100 must stop almost instantly, while within other geographical zones there may be bigger areas around the route which allows the autonomous vehicle 100 to take more time to stop. For each geographical zone, it may be possible to define how large deviation from the intended route that a fallback manoeuvre of the autonomous vehicle 100 may result in. Based on this distance, it may be possible to use a model of the autonomous vehicle 100 to decide, e.g. the maximum velocity limit and maximum steering angle in order to guarantee that the autonomous vehicle 100 stays within the allowed area. This decision may be made by the control unit 110 beforehand, i.e. offline, and the minimum and maximum parameters for velocity and steering angle may be kept in the database as described in some of the embodiments above. It may also be possible for the control unit 110 to calculate these limits or parameters in real-time, i.e. online. In this case, the allowed maximum deviation may, for example, be saved in the database. Here, the model of the autonomous vehicle 100 may be used to calculate these limits based on the real-time information, such as, e.g. road friction.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems and computer program products. It should be appreciated that the example embodiments presented herein may be practiced in any combination with each other. It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

It should also be noted that the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures and program modules represent examples of program code for executing steps of the methods disclosed herein. The particular sequence of such executable instructions or associated data structures represents examples of corresponding acts for implementing the functions described in such steps or processes. The embodiments herein are not limited to the above described preferred embodiments. Various alternatives, modifications and equivalents may be used. Therefore, the above embodiments should not be construed as limiting.

The invention claimed is:

1. A method performed by a control unit for operating an autonomous vehicle, the control unit is arranged to communicate via at least one antenna, wherein the method comprise:
   obtaining, based on a signal from the at least one antenna, information relating to at least one geographical zone associated with a transponder as the autonomous vehicle moves in proximity of the transponder;
   determining an autonomous operating mode of the autonomous vehicle based on the obtained information relating to the at least one geographical zone associated with the transponder; and
   operating the autonomous vehicle in accordance with the determined autonomous operating mode, wherein the obtained information relating to the at least one geographical zone associated with the transponder comprise a time limit and/or maximum driving distance, which in case of expiration before any information relating to another geographical zone associated with a subsequent transponder is obtained will cause the control unit to switch to another autonomous operating mode of the autonomous vehicle.

2. The method according to claim 1, wherein the autonomous operating mode comprises one or more of: a speed, a full stop command, an off-switch command, and one or more steering angle limits.

3. The method according to claim 1, wherein the autonomous operating mode comprises one or more threshold levels for the autonomous vehicle on any one of: one or more steering angle rates, an acceleration, a curvature, a yaw rate, an articulation rate, a roll angle, a driving direction, a type of propulsion to be used in case the autonomous vehicle is a hybrid vehicle.

4. The method according to claim 1, wherein the autonomous operating mode comprises a limitation for the autonomous vehicle to a set of determined approved vehicle actions, or one or more use requirements of difference vehicle applications or hardware.

5. The method according to claim 1, wherein the obtained information relating to the at least one geographical zone associated with the transponder comprise a time-dependent entrance criteria which if not fulfilled will cause the control unit to switch to another autonomous operating mode of the autonomous vehicle.

6. The method according to claim 1, wherein the obtained information relating to the at least one geographical zone associated with the transponder comprise an indication to follow a specifically defined path upon operating in the at least one geographical zone associated with the transponder which if not adhered to will cause the control unit to switch to another autonomous operating mode of the autonomous vehicle.

7. A control unit for operating an autonomous vehicle, the control unit is arranged to communicate via at least one antenna, wherein the control unit is configured to obtain, based on a signal from the at least one antenna, information relating to at least one geographical zone associated with a transponder as the autonomous vehicle moves in proximity of the transponder, determine an autonomous operating mode of the autonomous vehicle based on the obtained information relating to the at least geographical zone associated with the transponder, and operate the autonomous vehicle in accordance with the determined autonomous operating mode, wherein the control unit is further configured to switch to another autonomous operating mode of the autonomous vehicle in case a time limit and/or maximum driving distance comprised in the obtained information relating to the at least one geographical zone associated with the transponder, expires before any information relating to another geographical zone associated with a subsequent transponder is obtained.

8. The control unit according to claim 7, wherein the autonomous operating mode comprises one or more of: a speed, a full stop command, an off-switch command, and one or more steering angle limits.

9. The control unit according to claim 7, wherein the autonomous operating mode comprises one or more threshold levels for the autonomous vehicle on any one of: one or more steering angle rates, an acceleration, a curvature, a yaw rate, an articulation rate, a roll angle, a driving direction, or a type of propulsion to be used in case the autonomous vehicle is a hybrid vehicle.

10. The method according to claim 7, wherein the autonomous operating mode comprises a limitation for the autonomous vehicle to a set of determined approved vehicle actions, or one or more use requirements of difference vehicle applications or hardware.

11. The control unit according to claim 7, further configured to switch to another autonomous operating mode of the autonomous vehicle in case a time-dependent entrance criteria comprised in the obtained information relating to the at least one geographical zone associated with the transponder, expires before any information relating to another geographical zone associated with a subsequent transponder is not fulfilled.

12. The control unit according to claim 8, further configured to switch to another autonomous operating mode of the autonomous vehicle in case an indication to follow a specifically defined path upon operating in the at least one geographical zone associated with the transponder comprised in the obtained information relating to the at least one geographical zone associated with the transponder, is not adhered to.

13. A computer program comprising program code means for performing the steps of claim 1 when said program is run on a computer or on processing circuitry of a control unit.

14. A non-transitory computer program carrier carrying a computer program according to claim 13, wherein the computer program carrier is computer-readable storage medium.

15. An autonomous vehicle comprising a control unit according to claim 7.

16. The autonomous vehicle according to claim 15, wherein the autonomous vehicle is attached to a trailer, wherein the trailer is arranged with at least one additional antenna arranged to be connected to the control unit of the autonomous vehicle.

\* \* \* \* \*